United States Patent [19]
Kim et al.

[11] Patent Number: 5,515,721
[45] Date of Patent: May 14, 1996

[54] LOCAL RIVER FLOW VELOCITY MEASURING METHOD AND APPARATUS THEREFOR

[75] Inventors: Soo D. Kim; Hak S. Chang, both of Seoul; Kyung A. Park, Daejon, all of Rep. of Korea

[73] Assignee: Changmin Technology Co., Ltd., Rep. of Korea

[21] Appl. No.: 294,906

[22] Filed: Aug. 24, 1994

[30] Foreign Application Priority Data

Aug. 25, 1993 [KR] Rep. of Korea ............... 93-16628

[51] Int. Cl.$^6$ ................................................ G01F 13/00
[52] U.S. Cl. ........................... 73/170.13; 73/861.27; 73/861.31
[58] Field of Search .................. 73/170.13, 861.27, 73/861.28, 861.29, 861.31

[56] References Cited

U.S. PATENT DOCUMENTS

| | | | |
|---|---|---|---|
| 4,038,870 | 8/1977 | Rotier | 73/170.13 X |
| 4,391,136 | 7/1983 | Perkins et al. | 73/170.13 |
| 4,552,016 | 11/1985 | Suyama | 73/170.13 |
| 4,890,488 | 1/1990 | Pincent et al. | 73/170.13 |
| 5,343,744 | 9/1994 | Ammann | 73/170.13 |
| 5,373,736 | 12/1994 | Brown | 73/170.13 |

*Primary Examiner*—Richard Chilcot
*Assistant Examiner*—Elizabeth L. Dougherty
*Attorney, Agent, or Firm*—Irving Keschner

[57] ABSTRACT

A local river flow velocity measuring method and apparatus therefor comprises a flow velocity meter and a flow velocity measuring circuit, in which the flow velocity meter includes a plurality of ultrasonic vibrators mounted at the apexes A, B and C of a right angled triangle which sets a base $\overline{AC}$, a vertical side BC and a oblique side $\overline{AB}$, in which the distance of the oblique side $\overline{AB}$ is L, the height of the vertical side BC is h and an angle $\{(\Psi BAC)=\Psi\}$ is $\Psi$, the propagation time of ultrasonic pulses from the apexes C to B is measured, and an angle $\Psi + \alpha$ formed between the flow velocity vector V and the vertical side BC and an angle $\Psi - \beta$ formed between the flow velocity vector V and the oblique side AB are indirectly measured, thereby calculating the resulting flow velocity.

4 Claims, 4 Drawing Sheets

LOCAL RIVER FLOW VELOCITY MEASURING METHOD AND APPARATUS THEREFOR

BACKGROUND OF THE INVENTION

The invention is related to providing a technology of measuring an ultrasonic flow velocity, in particular, to providing a method for measuring the flow velocity of a local area, for example any place of a river and apparatus therefor.

PRIOR ART

The measuring of local flow velocity water flowing in a river is requisite for the purpose of studying the flow velocity distribution of water flowing or measuring the flow rate. A local river flow velocity measuring apparatus, for example a flow velocity meter for measuring the flow velocity at any points on the water flowing cross-section is typically a propeller flow velocity meter which is most often used. In addition to the propeller type meter, there are well known an electro-magnetic flow velocity meter, a pressure flow velocity meter including a pressure sensor and an ultrasonic flow velocity meter. Among these meters, the propeller flow velocity meter is generally used in a river for the reason that it possesses a directional property. The propeller flow velocity meter has an advantage that the resulted value by the measuring of the flow velocity of the direction deviated from a propeller rotational shaft may be considered as a flow velocity component of the rotational shaft direction as shown in FIG. 1.

FIG. 1A is a view illustrating a method of measuring the flow velocity when a propeller flow velocity meter is positioned to have its rotational shaft that is kept at a right angle to the cross-section of water flowing in a river.

FIG. 1B shows the directional feature of the propeller flow velocity meter. If the flow velocity direction is formed at a constant angle $\pm\alpha$ to the rotational shaft of a rotator (propeller), the rotation speed n of the rotator is changed pursuant to the co-sine law. The angle $\pm\alpha$ keeps the directional property based on the co-sine law, which is generally 10°–20°. It may differentiate in accordance to the kind of a flow velocity meter.

Thus, as shown in FIG. 1A, even if the flow velocity direction is formed at an angle $\alpha$ or $\alpha'$ to the rotator shaft, the rotation speed of the propeller flow velocity meter is proportional to the component of $v_1 \cos\alpha$ or $V_2 \cos\alpha'$. The flow velocity component V is perpendicular to the cross-section S and it is measured. It becomes a very important advantage at the time of measuring the flow of a river. Of course, a flow velocity meter operating according to other principals may reduce its sensitivity if the flow velocity component is not acted at a right angle to a sensing portion (sensor) of the flow velocity meter. Also, it is difficult to assure the directional property according to the co-sine law, because a flow velocity meter has a predetermined directional property.

A flow velocity meter to secure the most ideal directional property is an ultrasonic flow velocity measuring method to operate in an ultrasonic flow measuring meter for a pipe.

The ultrasonic flow velocity measuring principal is a physical law, which is shown in FIG. 2. The line connecting point A and point B in a river is perpendicular to the cross-section of water line, and ultrasonic vibrators called "transducer" is capable of generating and receiving ultrasonic pulses, which are disposed at the points A and B. The direction of a local flow velocity V is formed at an angle $\alpha$ or $\alpha'$ to a straight line AB. When the ultrasonic pulse is propagated from the point A to the point B and vice versa, each of the propagation time is $t_{AB}$ and $t_{BA}$, and the distance of the straight line AB is L. The time and frequency differences can be calculated as follows:

$$\Delta t = t_{AB} - t_{BA} = 2Lv/c^2 \text{ (Time difference Method)} \quad (1)$$

or $$\Delta f = 1/t_{AB} - 1/t_{BA} = 2v/L \text{ (Frequency Difference Method)} \quad (2)$$

Wherein, $v = V\cos\alpha$, $v = V\cos\alpha'$ and C is an ultrasonic velocity in water. Thus, the flow velocity v is calculated from the formulas 1 and 2 as follows:

$$v = \Delta t C^2 / 2L$$

$$v = \Delta f L / 2 \quad (3)$$

If the angles $\alpha$ and $\alpha'$ are zero, v is equal to V. If the angles $\alpha$ and $\alpha$ are 90°, v is zero. Thus, the ultrasonic vibrators are disposed on a straight line perpendicular to the cross-section S and the flow velocity is measured using the time difference or frequency difference method. In this case, the ideal co-sine directional property is exercised within the angle $\alpha$ ($\pm 90°$). Therefore, in order to demonstrate the cosine characteristics, a flow velocity meter 21 is fixed at a right angle to a supporting rod 22 as shown in FIG. 1A. The supporting rod 22 is put into a river along the cross-section S of water line. But, it is difficult to assure the positioning of the flow velocity meter at a right angle to the cross-section S.

On the other hand, a flow velocity meter of a cup type is used in large numbers instead of a propeller type flow velocity meter, especially in U.S.A.. The cup type flow velocity meter does not have the significant co-sine directional property which is different from the propeller type flow velocity meter.

But, these meters have the use of a supporting rod 22 making it impossible when the depth of water is very deep, or the position of a person who measures a flow velocity is far away from the surface of water. For example, the flow velocity measuring is performed on a bridge. Therefore, as shown in FIG. 3, the flow meter is fastened to near the end of a rope a along with a weight b, and then it is put in water, which is generally used. At that time, the following problems are brought out.

As the flow velocity makes faster, and of the length of the rope a (or wire), which is put in water or suspended in the air, becomes longer, it is pushed along the direction of the flow velocity even with the weight b. Even if any flow velocity meter is used, the flow velocity sensor can not be positioned to be corresponded with the direction of the flow velocity, so it is maintained at the angle $\alpha$ to the flow velocity direction.

Due to it, the flow velocity measuring result is led to a smaller flow velocity than the flow velocity V to cause the large measuring error, even if any flow velocity meter is used. The use of a propeller type or cup type flow velocity meters and an ultrasonic flow velocity meter shown in FIG. 2 can cause a large measuring error. Also, there is no way to measure the angle $\alpha$.

In light of these points, the main object of the invention is to provide a method and apparatus for measuring a local flow velocity in a river using an ultrasonic flow velocity apparatus to assure the ideal directional property.

The other object of the invention is to provide a method and apparatus for measuring a local flow velocity in a river without the shaft of a flow velocity sensor being corresponded to the direction of the flow velocity that is perpendicular to the cross-section of water line.

According to the invention, an ultrasonic flow velocity measuring method comprises steps: mounting each of ultrasonic vibrator at the apexes A, B and C of a right angled triangle and then setting a base $\overline{AC}$, a vertical side $\overline{BC}$ and a oblique side $\overline{AB}$ by reference to the water flowing direction; measuring the propagation time of ultrasonic pulses from the apexes C to B and vice versa; judging as to whether the difference between the propagation times is positive or negative and determining whether an angle formed between a flow velocity vector V and the oblique side AB of the length L is $\Psi+\alpha$ when the difference of the propagation time is positive; measuring the propagation time of ultrasonic pulses from the apexes B to A and vice versa and calculating the resulting flow velocity V; and determining whether an angle formed between a flow velocity vector V and the oblique side AB of the length L is $\Psi-\beta$ when the difference of the propagation time is negative at above step and then calculating the resulting flow velocity V.

Also, an ultrasonic flow velocity measuring apparatus of the invention comprises a flow velocity meter positioned in the predetermined depth of water and a flow velocity measuring circuit electrically connected by a high frequency cable to the flow velocity meter, in which the flow velocity meter comprises a plurality of vibrators mounted at the apexes A, B and C of a right angled triangle; a plurality of supporting rod supporting the ultrasonic vibrators at the apexes A, B and C; a cylinder member having a right angled bending portion into which at least one ultrasonic vibrator is inserted to be extended outward; a fixing portion mounted on a position of the cylinder member to put the supporting rods in the water; and a vertical bar for enabling the fixing portion to be moved along its longitudinal direction and to be positioned below the water, and the flow velocity measuring circuit receives ultrasonic vibrator signals and calculates the flow velocity according to its arithmetic algorithms.

Accordingly, the invention assures the directional property of a flow velocity measuring sensor during the river flow velocity measuring as well as it can accurately measure the local river flow velocity without the sensor being not corresponded to the flow velocity direction perpendicular to the cross-section of water line.

BRIEF DESCRIPTION OF THE DRAWINGS

The invention will now be described in detail with reference to the attached drawings, in which;

FIGS. 4A, 4B and 4C are views illustrating a method of measuring the ultrasonic flow velocity of a river according to the principal of the invention, in which FIG. 4A shows the method of measuring the flow velocity at the situation of a flowing direction being at a right angle to a flow cross-section and FIGS. 4B and 4C show the methods of measuring the flow velocity in a situation where of a vertical line is at a slant angle to a flowing cross-section; and, FIG. 5 is a view illustrating a flow velocity measuring apparatus according to the principal of the invention.

DETAILED DESCRIPTION OF THE INVENTION

Figure 4A:
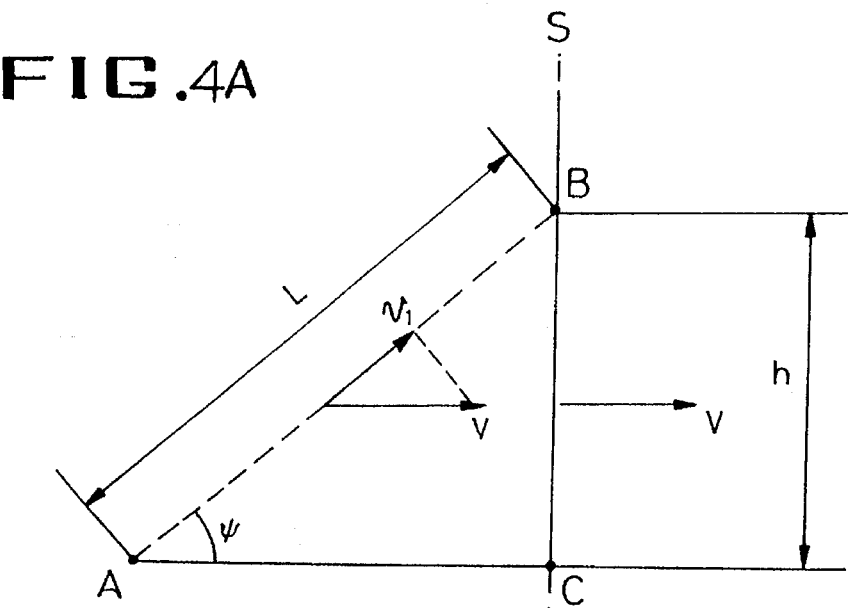

As shown in FIG. 4A, ultrasonic vibrators are respectively mounted at the apexes A, B and C of a right angled triangle. The straight line $\overline{B}$ is put in the water to be corresponded to the cross-section S, for example to be at a right angle to the flow velocity vector V. In that case, providing that ultrasonic pulses are launched from the points B to C or from the points C to B, the propagation time is as follows:

$$t_{BC}=h/C=t_{CB}$$

Wherein, C is an ultrasonic velocity, v is appeared as $V\cos 90°$ (=0). The propagation time of ultrasonic pulses launched from the points B to A or from the points A to B are as follows:

$$t_{BA}=L/(C-v_1);\ t_{AB}=L/(C+v_1)$$

The time difference is calculated as follows:

$$\Delta t=t_{BA}-t_{AB}=2Lv_1/C^2$$

The frequency difference is calculated as follows:

$$\Delta f=1/t_{BA}-1/t_{AB}=2v_1/L$$

An angle is already known. The flow velocity is calculated as follows:

$$V=v_1/\cos\Psi=\Delta t\cdot C^2/2L\cos\Psi=\Delta fL/2\cos\Psi \quad (4)$$

Figure 3:
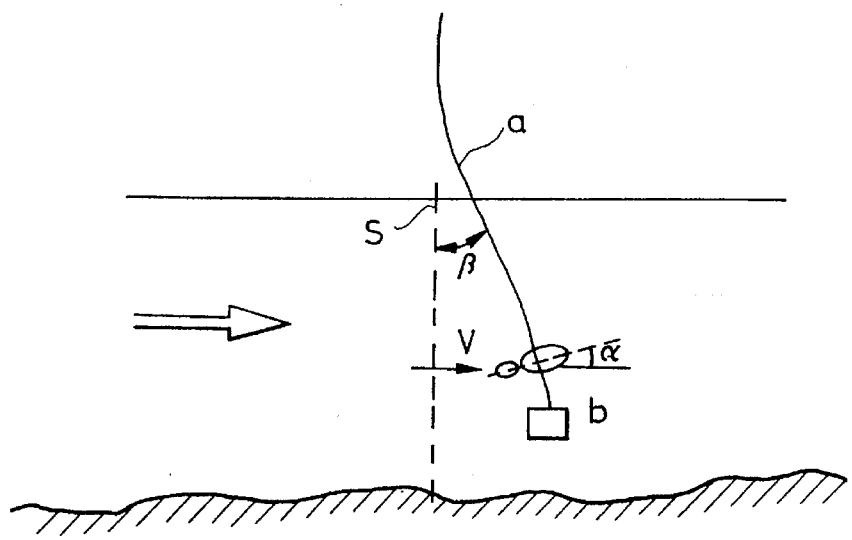
FIG. 3 is a view illustrating the measuring error of the flow velocity when a conventional flow velocity measuring apparatus is positioned in a river.
Figure 4B:
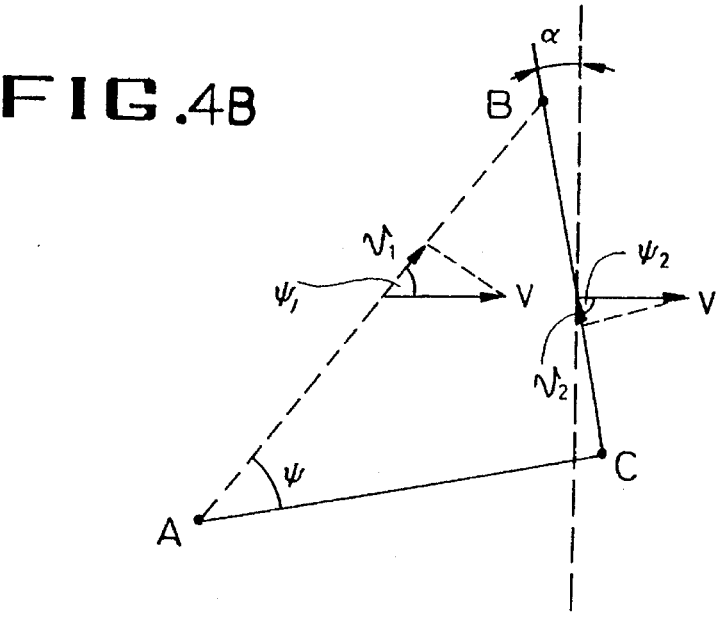
Figure 4C:
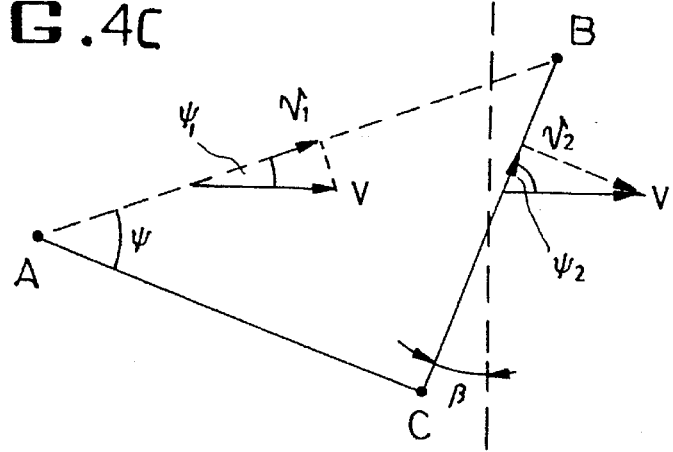

The formula 4 is generally used in measuring the flow velocity on the diameter line of a pipe by an ultrasonic flow meter. For example, an ultrasonic flow meter in the name of Model No. UL600R developed by Japanese Tokyo Keison Co. adapts a time difference flow velocity measuring method. But, as shown in FIGS. 4B and 4C, if the straight line $\overline{BC}$ is slanted with not being corresponded to the cross-section S, the flow velocity measuring based on the formula 4 causes a serious error. Referring to FIG. 4B, it shows a situation where a rope a is not maintained in a vertical line as shown in FIG. 3. At that time, the ultrasonic pulses are launched from the points C to B or from B to C, and the propagation times $t_{CB}$ and $t_{BC}$ corresponding to the length h are measured. Then the time difference between the propagation times is calculated as follows:

$$t_{BC}=h/(c+v_2);\ t_{CB}=h/(Cv_2);\ t_{CB}>t_{BC} \quad (5)$$

$$t_2=t_{CB}-t_{BC}=2hv_2/C^2 \quad (5)$$

$$V_2=V\cdot\cos\Psi=V\cdot\cos(90°-\alpha)\ 'V\sin\alpha$$

The frequency difference method is adapted in a following:

$$f_2=1/t_{CB}-1/t_{BC}\%=2v_2/h \quad (6)$$

Next, the ultrasonic pulses are launched from the points B to A or from A to B, and the propagation times $t_{BA}$ and $t_{AB}$ corresponding to the length L are measured. Then, the time difference between them is calculated as follows:

$$\Delta t_1=2Lv_1/C \quad (7)$$

The frequency difference method is adapted in a following:

$$\Delta f_1=2v_1/L \quad (8)$$

Therefore, the flow velocity is:

$$v_1 = V \cdot \cos\Psi_1 = V\cos(\Psi+\alpha) \quad (9)$$

In order to measure the flow velocity, the angle $\alpha$ must be ascertained.

1) The proportion of the time differences is calculated as follows:

$$\Delta t_1/\Delta t_2 = (L/h) \cdot (v_1/v_2) = (L/h) \cdot \{\cos(\Psi+\alpha)/\sin\alpha\}$$
$$= (L/h) \cdot \cos\Psi \cot\alpha - \sin\Psi) = \cot\Psi \cot\alpha - 1$$

where, $\cot\Psi = (L/h)\cdot\cos\Psi$; $(L/h)\cdot\sin\Psi = 1$.

$$\alpha = \text{arc} \cdot \cot[(\Delta t_1/\Delta t_2 + 1)/\cot\Psi] \quad (10)$$
$$= \text{arc} \cdot \cot[E]$$

2) The proportion of the frequency differences is calculated as follows:

$$\frac{\Delta f_1}{\Delta f_2} = (h/L)(v_1/v_2) = (h/L)(\cos\psi \cot\alpha - \sin\psi) = \quad (11)$$

$$\sin\psi\cos\psi\cot\alpha - \sin^2\psi$$

Thus, the angle $\alpha$ is:

$$\alpha = \text{arc}\cdot\cot[(\Delta f_1/\Delta f_2 + \sin^2\Psi)/\sin\Psi\cdot\cos\Psi]$$

Such that, the angle $\alpha$ is obtainable from the proportions of the time or frequency differences $\Delta t_1/\Delta t_2$ or $\Delta f_1/\Delta f_2$. Therefore, the resulting flow velocity measuring formula is:

$$V = v_1/\cos(\Psi+\alpha) = \Delta t_1 C^2/2L\cos[\Psi+\text{arc}\cdot\cot\{E\}]$$

The ultrasonic velocity is:

$$C = 2L/(t_{AB}+t_{BA})$$

The flow velocity is:

$$V = 2L\cdot\Delta t_1/((t_{AB}+t_{BA})^2\cdot\cos[\Psi\text{arc}\cdot\cot\{E\}] \quad (12)$$

Wherein, $$E = (\Delta t_1/\Delta t_2 + 1)/\cot\Psi$$

In the frequency difference method, the flow velocity is:

$$V = \Delta f_1\cdot L/2\cos[\Psi+\text{arc}\cdot\cot\{E'\}] \quad (13)$$

Wherein, $$E' = (\Delta f_1/\Delta f_2 + \sin^2\Psi)/\sin\Psi\cdot\cos\Psi$$

The flow velocity formulas 12 and 13 are valid under the following condition:

$$t_{BC} < t_{CB}, \quad t_{BA} > t_{AB} \quad (14)$$

In other words, if the propagation, time of an ultrasonic pulse from the points B to C is smaller than that of an ultrasonic pulse from the points C to B, it is determined whether the straight line BC is slanted contrary to the flow velocity direction, and the flow velocity is calculated based on the flow velocity measuring formulas 12 and 13.

If the straight line $\overline{BC}$ is inclined toward the flow velocity direction at an angle $\beta$ to the cross-section S as shown in FIG. C, the following conditions are established; $t_{BC} > t_{CB}$, $t_{BA} > t_{AB}$, while the propagation time difference is:

$$+\Delta t_2 = t_{BC} - t_{CB} \text{ or } -\Delta t = t_{CB} - t_{BC}$$

As shown in FIG. 4C, $$v_1 = V\cos\Psi_1 = V\cos(\Psi-\beta)$$

$$v_2 = V\cos\Psi_2 = V\cos(90°-\beta)$$

The proportions of the time and frequency difference $\Delta t_1/\Delta t_2$ and $\Delta f_1/\Delta f_2$ are as follows:

$$\Delta t_1/\Delta t_2 = (L/h)\cdot\cos\Psi\cot\beta + \sin\Psi) = \cot\Psi\cot\beta + 1$$

and, $$\Delta f_1/\Delta t_2 = (L/h)(\cos\psi\cot\beta - \sin\psi)\%32 \sin\psi\cos\psi\cot\beta + \sin^2\psi$$

Thus, the angle $\beta$ is as follows:

$$\beta = \text{arc}\cdot\cot[(\Delta t_1/\Delta t_2 - 1)/\cot\Psi]$$

or, $$\beta = \text{arc}\cdot\cot[(\Delta f_1/\Delta f_2 - \sin^2\Psi)/\sin\Psi\cdot\cos\Psi]$$

The flow velocity measuring formulas are:

$$V = \frac{2L\Delta t_1}{(t_{AB}+t_{BA})^2 \cdot \cos\left\{\psi - \text{arc}\cot\left[\dfrac{\left(\dfrac{\Delta t_1}{\Delta t_2}-1\right)}{\cot\psi}\right]\right\}} \quad (15)$$

or, $$V = \frac{L\Delta f_1}{2\cos\left\{\psi - \text{arc}\cot\left[\dfrac{\left(\dfrac{\Delta f_1}{\Delta f_2}-\sin^2\psi\right)}{\sin\psi\cos\psi}\right]\right\}} \quad (16)$$

On the other hand, seeing the formulas 12, 13, 14 and 15, the parameters to be measured are $t_{BC}$, $t_{CB}$, $t_{BA}$ and $t_{AB}$. Other parameters L, $\Psi$ and h are previously measured. Furthermore, sin, $\sin^2\Psi$ and cot in the formulas are previously calculated and stored at a memory circuit.

Figure 1A:
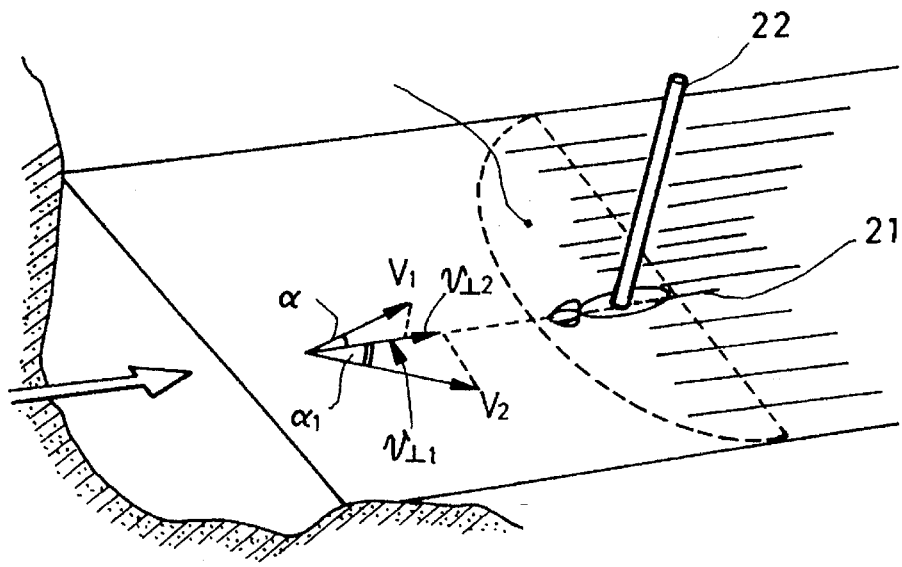
FIGS. 1A and 1B illustrate the principal of measuring the flow velocity of a river, using a conventional flow velocity measuring apparatus.
Figure 1B:
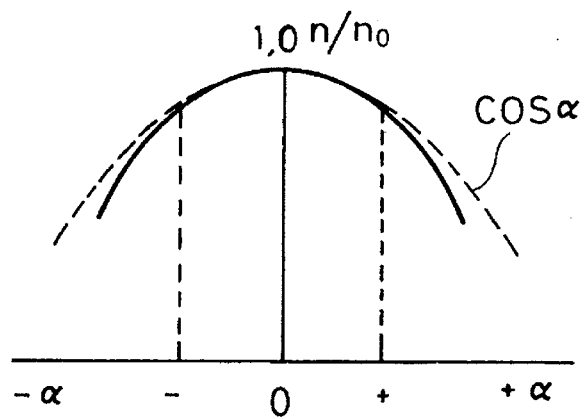
Figure 2:
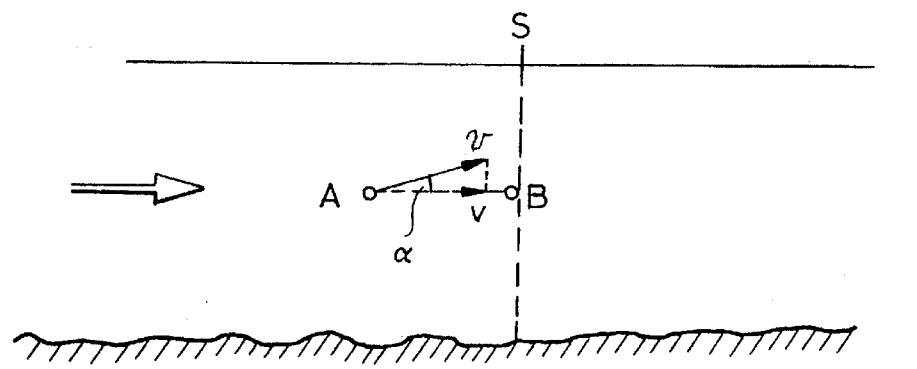
FIG. 2 is a view illustrating the principal of measuring the flow velocity of a river using an ultrasonic vibrator.
Figure 2:
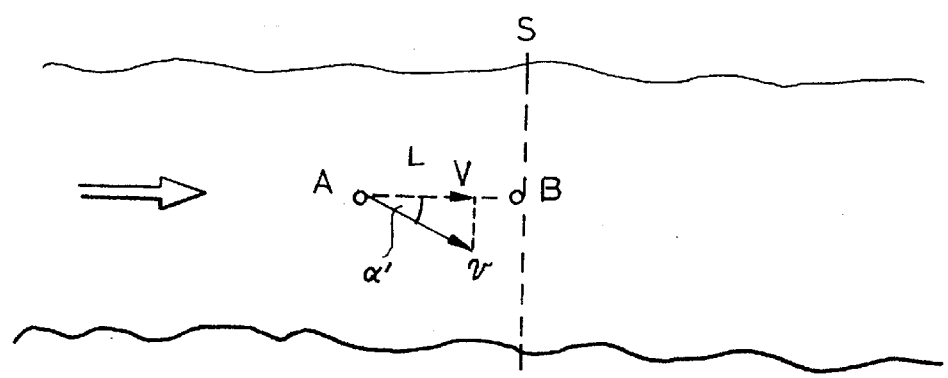

If the angles $\alpha$ and $\beta$ are zero, $\Delta t_2$ is zero. At that time, these angles $\alpha$ and $\beta$ do not require calculation, and the formula 4 is considered as a flow velocity measuring formula. When it is intended to measure the flow velocity in a complex shaped river, not a straight river, the local flow velocity direction is often misled not to a right angle to the selected cross-section S of water line. In that case, the flow velocity meter has to be fixed to a supporting rod 22 as shown in FIG. 1 during the flow velocity measuring. Otherwise, if the flow velocity meter is fixed to a rope "a" as shown in FIG. 3, the rope a has a heavy weight "b" enough to be stably positioned in a vertical line below water. The heavy weight b is tied up at the end of the rope. Under these condition, the right angled component flow velocity can be measured using above flow velocity measuring formulas.

Figure 5:
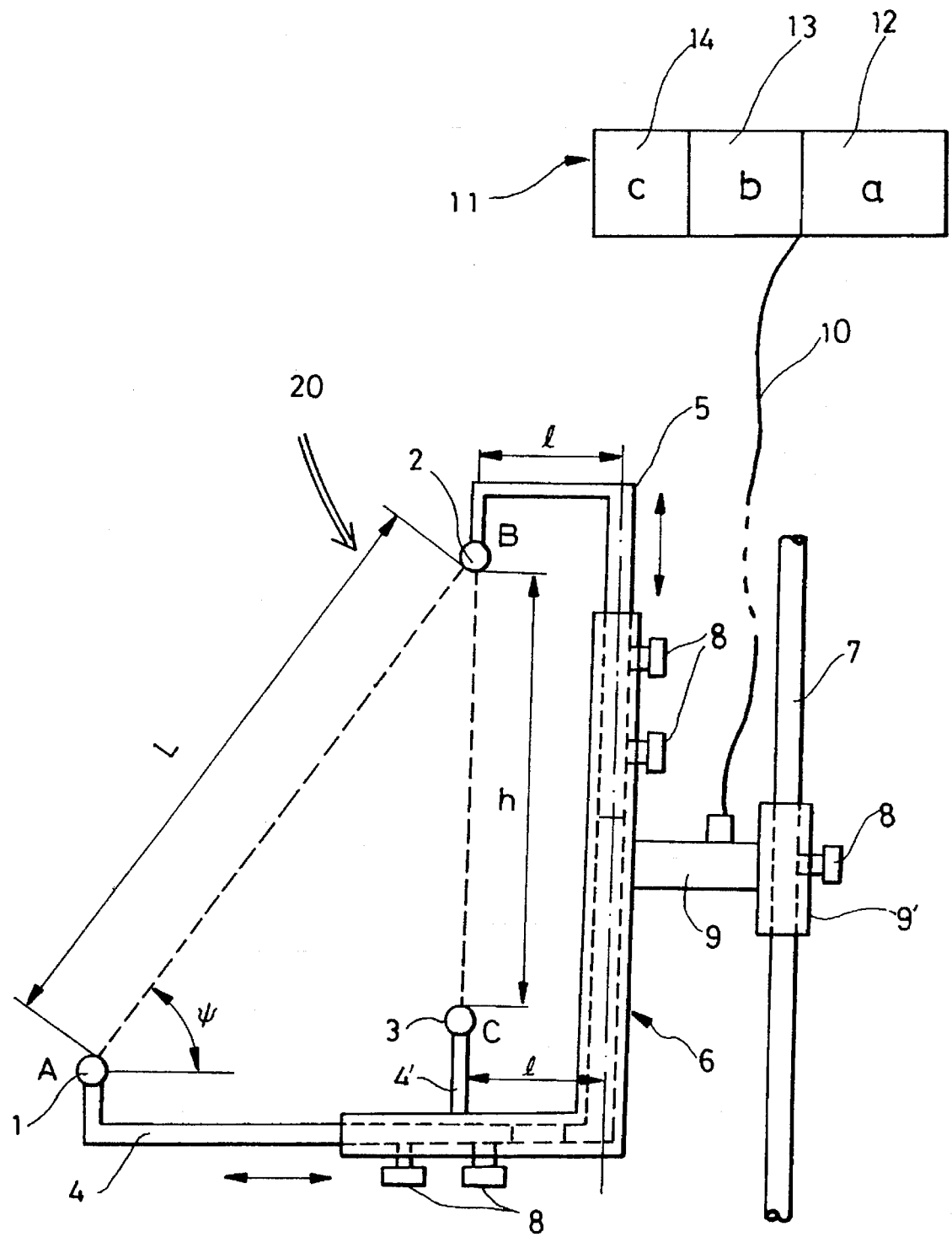

On the other hand, an apparatus to show a method for measuring the local river flow velocity is shown in FIG. 5. The local river flow velocity measuring apparatus comprises a flow velocity meter 20 put in water and a flow velocity measuring circuit 11 eclectically connected to the flow velocity meter 20 by a cable 10.

The flow velocity meter 20 is in the form of a right angled triangle and includes ultrasonic vibrators 1, 2 and 3 mounted at the apexes A, B and C of the right angled triangle. The ultrasonic vibrator 2 has a wide directional property to receive ultrasonic pulses from the ultrasonic vibrators 1 and 3. The ultrasonic pulse launched from the ultrasonic vibrator 2 is reached at the ultrasonic vibrators 1 and 3 with the sufficient energy.

The ultrasonic vibrators 1, 2 and 3 are mounted at the end of supporting rods 4, 4' and 5 which is in the form of an empty pipe. The supporting rods 4, 4' and 5 each includes a cable electrically connected to the ultrasonic vibrators 1, 2 and 3 therein. Also, the supporting rods 4, 4' and 5 are fixed to a cylinder member 6 having a bending portion bent at a right angled position to form a right angled triangle. The cylinder member 6 has a larger diameter than that of the supporting rods. Therefore, the supporting rod 4 is supported by at least one fixture 8 so that one end is extended up to a predetermined height and it is inserted from one end into the end of the cylinder member 6. The supporting rod 4' is fixed near the vertical side of the right angled triangle at one end to the extension portion of the cylinder member 6. The supporting rod 5 is inserted into the vertical side of the cylinder member 6 and fixed by at least one fixture 8 to be extended. The horizontal portion of the supporting rod 4 is separated away by a distance l from the cylinder member 6 along with the supporting rod 4'. The end of the supporting rod 4 having the ultrasonic vibrator 2 is bent downward by a predetermined distance. Thus, the supporting rod 4 is movable leftward and rightward in the cylinder member 6, and the supporting rod 4' is movable upward and downward in the cylinder member 6, so that the distance L and the height h is adjustable. The angle θ is calculated by measuring the distance L and the height h.

Also, the ultrasonic vibrator 3 is disposed on the higher position over that of the ultrasonic vibrator 1 not to be influenced by the eddy current which is generated behind the ultrasonic vibrator 2, the ultrasonic vibrators 1 and 2 are arranged in a interval $1 \geq 5d$ from the center line of the cylinder member 6 (wherein, d is the outer diameter of the cylinder member 6, and the interval 1 is set to avoid the influence of the disturbance by the cylinder member 6.

The flow velocity meter 20 is provided with a supporter 9 to be put in water. The supporter 9 includes a clamp (not shown) for gripping a body portion of the cylinder member 6 at one end and an auxiliary supporter 9' which is coupled with a positioning rod 7 by a fixture 8, so that the flow velocity meter 20 is positioned below the water. The supporter 9 includes the terminal of the high frequency cable 10 to enable the detecting signals from the ultrasonic vibrators to be transferred to a flow velocity measuring circuit 11.

The flow velocity measuring circuit 11 comprises an well known analog circuit 12, which includes an oscillator generating a high frequency for an ultrasonic; an ultrasonic receiving/amplifying circuit; a pulse signal shaping circuit and a communicating interface for assuring the firing/receiving order of the ultrasonic signals from the ultrasonic vibrators; a microprocessor including a circuit for controlling the analog circuit 12, an ultrasonic propagation time measuring portion and a computing portion for calculating the flow velocity according to the system algorithms; and a digital display for displaying the flow velocity and the angles α and β. On the other hand, the flow velocity measuring circuit 11 can use a dry battery and liquid battery as a power supply apparatus.

The flow velocity measuring apparatus according to the invention selects the distance L and the height h considering the following conditions:

1) When the flow velocity is small, it is preferable to lessen the angles α and β so as to increase the sensitivity of a flow velocity meter.

2) In order to exactly measure the angles α and β, the longer the vertical side height h, the more it is desirable.

3) When it is difficult to throw a flow velocity measuring apparatus in the position which is intended to measure the flow velocity, the longer vertical side height h is preferable. Also, when a river is large, it is disable to select the height h and the distance L at maximum and then measure the average flow velocity of the water passing through the region of the vertical side h.

4) When the local flow velocity of a very narrow area is measured, the vertical side height h is selected at minimum.

As described above, the invention has a high adaption according to the selection purposes of the distance L and the height h. A flow velocity measuring method according to the principal of the invention is as follows:

1) After the adjustment of the distance L and the height h, the corresponding parameters, for example the distance L, the height h, the angles Ψ, cot Ψ, sin Ψ etc. are inputted to or stored at a flow velocity measuring apparatus.

2) A flow velocity meter is put in the predetermined position of the water.

3) The ultrasonic pulses are propagated from an ultrasonic vibrator 3 to an ultrasonic vibrator 2 and vice versa. At this point, the propagation times $t_{CB}$ and $t_{BC}$ of ultrasonic pulses are measured and then stored at a flow velocity measuring circuit.

4) The difference between the propagation times $t_{CB}$ and $t_{BC}$ is calculated as follows; $\Delta t_2 = t_{CB} - t_{BC}$. If $\Delta t_2$ is positive, it is determined whether the straight line BC is inclined contrary to the flow velocity direction, (or the frequency difference is calculated as follows; $\Delta f_2 = 1/t_{CB} - 1/t_{BC}$, and then stored).

5) The ultrasonic pulses are propagated from an ultrasonic vibrator 2 to an ultrasonic vibrator 1 and vice versa. At that time, the propagation times $t_{BA}$ and $t_{AB}$ of ultrasonic pulses are measured and then stored at the flow velocity measuring circuit.

6) The difference between the propagation times $t_{BA}$ and $t_{AB}$ is calculated as follows; $\Delta t_1 = t_{BA} - t_{AB}$, (or the frequency difference is calculated as follows; $\Delta f_1 = 1/t_{BA} - 1/t_{AB}$, and then stored).

7) If the time and frequency differences $\Delta t_2$ and $\Delta f_2$ are zero, The flow velocity V is as follows:

$$V = 2L \Delta t_1 / 2\cos\Psi + x(t_{AB} + t_{BA})^2$$

or, $$V = \Delta f_1 \cdot L / 2\cos\Psi$$

Then, the calculated value is represented at a display 14.

8) If the time difference $\Delta t_2$ is not zero, but positive, a) The angle α is:

$$\alpha = \text{arc·cot}[(\Delta t_1/\Delta t_2 + 1)/\cot\Psi]$$

or, $$\alpha = \text{arc·cot}[(\Delta f_1/\Delta f_2 + \sin^2\Psi)/\sin\Psi \cdot \cos\Psi]$$

Then, the calculated value is represented at the display 14.

b) The flow velocity is:

$$V = 2L \cdot \Delta t_1 / (t_{AB} + t_{BA})^2 \cdot \cos(\Psi + \alpha)$$

or, $$V = \Delta f_1 \cdot L / 2\cos(\Psi + \alpha)$$

Then, the calculated values are represented at the display 14 with the angle α.

9) If the time difference $\Delta t_2$ is not zero, but negative, a) The angle β is:

$$\beta = \text{arc·cot}[(\Delta t_1/\Delta t_2 - 1)/\cot\Psi]$$

or, $$\beta = \text{arc·cot}[(\Delta f_1/\Delta f_2 - \sin^2\Psi)/\sin\Psi·\cos\Psi]$$

b) The flow velocity is:

$$V = 2L·\Delta t_1/(t_{AB}+t_{BA})^2·\cos(\Psi-\beta)$$

or, $$V = \Delta f_1·L/2\cos(\Psi-\beta)$$

Then, the calculated values are represented at the display 14 with the angle β.

Accordingly, a flow velocity measuring method and apparatus of the invention is superior at the accurate degree of the flow velocity measuring to a propeller or cup type flow velocity meter, an electronic flow velocity meter and a pressure flow velocity meter. Particularly, in measuring the local flow velocity for a river flow measuring, the invention significantly reduces the measuring error even through the flow velocity component is inclined as to a flow velocity direction with not being perpendicular to a flow velocity measuring cross-section.

The invention does not have any rotational portion unlike the propeller or cup type flow velocity meter. It prolongs its life and enables the measuring characteristics (called the correction property) of a flow velocity meter to be maintained foe a long time. The invention has an advantage that the auxiliary equipments for facilitating the propeller or cup type flow velocity meter to measure the flow velocity can be also used.

What is claimed is:

1. A local river flow velocity measuring method comprising the steps of:

mounting ultrasonic vibrators at the apexes A, and C of a right angled triangle and then setting an angle BAC as Ψ by taking a base $\overline{AC}$, a vertical side $\overline{BC}$ and an oblique side $\overline{A}$ using the reference as the water flow direction;

measuring the propagation time of ultrasonic pulses from the apexes B to A and vice versa to determine the difference $\Delta t_1$ therebetween and/or the difference $\Delta f_1$ of the reciprocal number of the propagation times and measuring the propagation time of ultrasonic pulses from the apexes C to B and vice versa to determine the difference $\Delta t_2$ therebetween and the difference $\Delta f_2$ of the reciprocal number of the propagation times, simultaneously;

determining whether the difference $\Delta t_2$ between the propagation times from the apexes C to B or the difference $\Delta f_2$ its reciprocal number is positive or negative, if positive determining whether an angle formed between a flow velocity vector V and the oblique side $\overline{AB}$ of the length L is Ψ+α and calculating the angle as follows;

in a method using the time difference $$\alpha = \text{arc.cot}[(\Delta t_1/\Delta t_2+1)/\cot\Psi]$$

in a method using the frequency difference, $$\alpha = \text{arc.cot}[(\Delta f_1/\Delta f_2+\sin^2\Psi/\sin\Psi.\cos\Psi]; \text{ and}$$

determining whether an angle formed between the flow velocity vector V and the oblique side $\overline{AB}$ of the length L is Ψ−β if the difference of the propagation time is negative, calculating the angle β as follows, in the method using the time difference, $$\beta = \text{arc.cot}[(\Delta t_1/\Delta t_2-1)/\cot\Psi]$$

in the method using the frequency difference $$\beta = \text{arc.cot}[(\Delta f_1/\Delta f_2-\sin^2\Psi/\sin\Psi.\cos\Psi]$$

2. A local river flow velocity measuring apparatus comprising:

a flow velocity meter positioned in the predetermined depth of water; and a flow velocity measuring circuit connected to the flow velocity meter with a high frequency cable, the flow velocity meter comprising a plurality of ultrasonic vibrators mounted at the apexes A, B and C of a right angled triangle; a plurality of rods supporting the ultrasonic vibrators at the apexes A, B and C; a cylinder member having a right angled bending portion in which the supporting rod having the apex A is fixed to the cylinder member to be horizontally flexible, the supporting rod having the apex B is fixed to the cylinder member to be vertically flexible, whereby the distance L between the apexes A and B and the vertical side height h between the apexes B and C are adjustable; and the flow velocity measuring circuit receives ultrasonic vibrator signals and calculates the flow velocity according to its arithmetic algorithms.

3. The local river flow velocity measuring apparatus according to claim 2, in which:

the apex C is positioned higher that the apex A.

4. The local river flow velocity measuring apparatus according to claim 2, in which:

the distance which the ultrasonic vibrator at the apex C is separated away from the cylinder member is selected to avoid the distortion effects of the flow velocity profile due to the cylinder member.

* * * * *

UNITED STATES PATENT AND TRADEMARK OFFICE
CERTIFICATE OF CORRECTION

PATENT NO. : 5,515,721
DATED : May 14, 1996
INVENTOR(S) : Soo D. Kim et al

It is certified that error appears in the above-indentified patent and that said Letters Patent is hereby corrected as shown below:

In column 9, line 33, after "A," insert -- $\overline{B}$ --. On line 36, delete "$\overline{A}$" and insert -- $\overline{AB}$ -- therefor. On line 49, before "its" insert -- of --.

Signed and Sealed this

Twenty-seventh Day of August, 1996

Attest:

BRUCE LEHMAN

Attesting Officer     Commissioner of Patents and Trademarks